D. Collins' Fan Mill.
No. 121,085. Fig. 1. Patented Nov. 21, 1871.
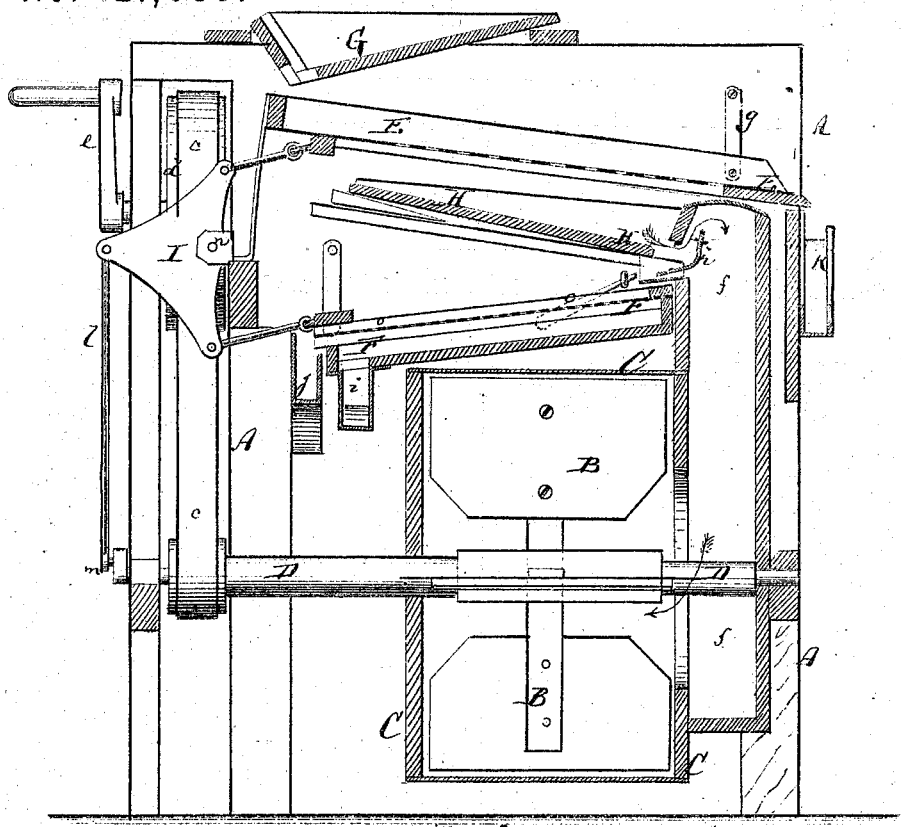
Fig. 2.
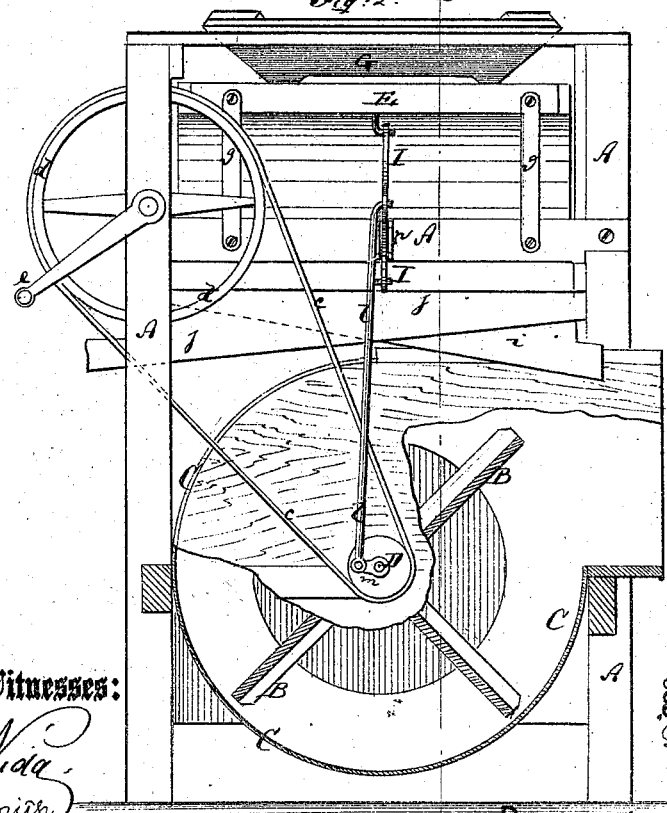
Witnesses:
Chas. Nida
Wm H. C. Smith
Inventor:
D. Collins
Per
Attorneys.

UNITED STATES PATENT OFFICE.

DANIEL COLLINS, OF ZANESFIELD, OHIO.

IMPROVEMENT IN FANNING-MILLS.

Specification forming part of Letters Patent No. 121,085, dated November 21, 1871.

*To all whom it may concern:*

Be it known that I, DANIEL COLLINS, of Zanesfield, in the county of Logan and State of Ohio, have invented a new and Improved Fan-Mill; and I do hereby declare that the following is a full, clear, and exact description thereof, which will enable others skilled in the art to make and use the same, reference being had to the accompanying drawing forming part of this specification, in which—

Figure 1 represents a vertical longitudinal section of my improved fan-mill, the line $a\,b$, Fig. 2, indicating the plane of section. Fig. 2 is a side view, partly in section, of the same.

Similar letters of reference indicate corresponding parts.

My invention consists in the improvement of fanning-mills, as hereinafter fully described and subsequently pointed out in the claim.

A in the drawing represents the frame and case of my improved fan-mill. B is the fan hung in the lower part of the frame within a cylindrical shell, C, and mounted upon a longitudinal shaft, D, as shown. The shaft receives rotary motion by a belt, $c$, or otherwise from a wheel, $d$, which is revolved by a suitable crank-handle, $e$, or is otherwise rotated in suitable manner. The shell C is open at the side for the discharge of air. It draws the air from a tube or conduit, $f$, through an opening in the end of the shell. In the upper part of the frame A are arranged a vibrating perforated plate, E, and a vibrating screen, F. The plate E is suspended by pivot-links $g$ from the side of the frame below a stationary hopper, G. The screen F is suspended from the sides of the frame A below the perforated plate E. An inclined stationary board, H, is interposed between E and F, as is clearly shown in Fig. 1. The lower end of the board H is in close proximity to the upper end of the conduit $f$, a transverse trough, $h$, being interposed between the board and conduit, as shown. The upper end of the screen is close under the trough $h$, and its lower end carries a spout, $i$, as shown. Another spout, $j$, is transversely affixed within the frame to receive the matter discharged from the sieve of the screen. The grain is first put into the hopper and fed from the same to the perforated plate E, through the apertures of which the grain will drop, while the straw remains and is shaken into a spout, $k$, hung below the lower end of E. Shaking motion is imparted to E and F simultaneously, but in opposite directions, by a vibrating lever, I, which receives motion by a pitman, $l$, from a wrist-pin, $m$, of the shaft D. The lever is at $n$ pivoted to the frame A, and has its upper and lower ends respectively connected with E and F to impart motion to the same. The grain and chaff dropping through the plate E fall upon the plate H and slide on the same into the trough $h$, while on the plate H the chaff and grain are exposed to the suction of the fan, so that the chaff and light matter will be drawn into the conduit $f$ and shell C, while the grain falls into the trough $h$, and thence upon the sieve $o$ of the screen. Even on the sieve the grain will remain exposed to the suction of the fan and separated from light impurities, and will then roll into the spout $j$. The matter dropping through the meshes of the sieve $o$ will fall upon the bottom of the screen and thence into the spout $i$. The chaff taken from the grain by the suction of the fan enters the shell C, and can thence be discharged into a suitable flue or chimney.

Having thus described my invention, I claim as new and desire to secure by Letters Patent—

1. The arrangement of trough $h$ in relation to plate H and suction-tube $f$, as and for the purpose specified.

2. The vibrating and perforated plate E and the fixed plate H, combined as described with trough $h$, tube $f$, and screen F, for the purpose specified.

DANIEL COLLINS.

Witnesses:
 W. B. KNIGHT,
 J. M. CORWIN.

(159)